United States Patent
Allen

(10) Patent No.: US 8,401,294 B1
(45) Date of Patent: Mar. 19, 2013

(54) PATTERN MATCHING USING CONVOLUTION OF MASK IMAGE AND SEARCH IMAGE

(75) Inventor: Brett A. Allen, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1076 days.

(21) Appl. No.: 12/346,176

(22) Filed: Dec. 30, 2008

(51) Int. Cl.
| | |
|---|---|
| G06K 9/64 | (2006.01) |
| G06K 9/00 | (2006.01) |
| G06K 9/34 | (2006.01) |
| G06K 9/50 | (2006.01) |
| G06K 9/62 | (2006.01) |
| G06K 9/68 | (2006.01) |
| G09G 5/00 | (2006.01) |

(52) U.S. Cl. ........ 382/181; 382/279; 382/173; 382/205; 382/209; 382/218; 345/615

(58) Field of Classification Search .................... 382/279
See application file for complete search history.

(56) References Cited

U.S. PATENT DOCUMENTS

| | | | | |
|---|---|---|---|---|
| 4,790,028 A | * | 12/1988 | Ramage | 382/298 |
| 4,991,092 A | * | 2/1991 | Greensite | 382/131 |
| 5,548,659 A | * | 8/1996 | Okamoto | 382/107 |
| 6,073,100 A | * | 6/2000 | Goodridge, Jr. | 704/258 |
| 7,343,281 B2 | * | 3/2008 | Breebaart et al. | 704/205 |
| 7,778,482 B2 | * | 8/2010 | Chen et al. | 382/274 |
| 2003/0185450 A1 | * | 10/2003 | Garakani et al. | 382/232 |
| 2003/0202709 A1 | * | 10/2003 | Simard et al. | 382/243 |
| 2004/0090453 A1 | * | 5/2004 | Jasinschi et al. | 345/723 |
| 2004/0267521 A1 | * | 12/2004 | Cutler et al. | 704/202 |
| 2007/0036410 A1 | * | 2/2007 | Ida et al. | 382/128 |
| 2008/0002873 A1 | * | 1/2008 | Reeves et al. | 382/133 |
| 2008/0031542 A1 | * | 2/2008 | Lei | 382/283 |
| 2008/0170650 A1 | * | 7/2008 | Theil | 375/360 |
| 2009/0028380 A1 | * | 1/2009 | Hillebrand et al. | 382/100 |
| 2009/0110248 A1 | * | 4/2009 | Masuda et al. | 382/118 |
| 2009/0220127 A1 | * | 9/2009 | Bedros et al. | 382/118 |
| 2009/0260079 A1 | * | 10/2009 | Anbo | 726/22 |
| 2010/0290668 A1 | * | 11/2010 | Friedman et al. | 382/103 |
| 2011/0255761 A1 | * | 10/2011 | O'Dell et al. | 382/131 |

OTHER PUBLICATIONS

J.P. Lewis "Fast Template Matching", Vision Interface 95, Canadian Image Processing and Pattern Recognition Society, Quebec City, Canada, May 15-19, 1995, pp. 120-123.

* cited by examiner

*Primary Examiner* — Michelle Entezari

(74) *Attorney, Agent, or Firm* — Fish & Richardson P.C.

(57) ABSTRACT

Among other disclosed subject matter, a computer-implemented method for pattern matching includes receiving a pattern image, a mask image and a search image, the mask image having an arbitrary shape and identifying a portion of the pattern image. The method includes evaluating a normalized cross-correlation equation based on the pattern image, the mask image and the search image, including at least a convolution of the mask image and the search image. The method includes outputting a result of evaluating the normalized cross-correlation equation, the result indicating whether the search image matches the portion of the pattern image.

20 Claims, 4 Drawing Sheets

PATTERN MATCHING USING CONVOLUTION OF MASK IMAGE AND SEARCH IMAGE

TECHNICAL FIELD

This document relates to pattern matching.

BACKGROUND

Pattern matching can be relevant in any of a number of technology areas, such as in animation or visual effects. An existing approach for pattern matching allows the search to be made for a pattern of arbitrary shape, but it is associated with relatively substantial computation costs, on the order of $n^4$ calculations per search image, where n is proportional to the radius of the pattern being sought.

Another approach for pattern matching has obtained a less substantial calculation load, on the order of $n^2 \log n$, but it is restricted to patterns of a rectangular shape and does not provide pattern matching of an arbitrary shape. While an arbitrary pattern of interest can be inscribed in a rectangle of sufficient size, this may introduce unwanted noise in the pattern matching.

SUMMARY

The invention relates to pattern matching using convolution of mask image and search image.

In a first aspect, a computer-implemented method for pattern matching includes receiving a pattern image, a mask image and a search image, the mask image having an arbitrary shape and identifying a portion of the pattern image. The method includes evaluating a normalized cross-correlation equation based on the pattern image, the mask image and the search image, including at least a convolution of the mask image and the search image. The method includes outputting a result of evaluating the normalized cross-correlation equation, the result indicating whether the search image matches the portion of the pattern image.

Implementations can include any or all of the following features. The convolution can include at least $$D \leftarrow \mathcal{F}^{-1}(\mathcal{F}(M)\mathcal{F}^*(S)); \text{ and}$$

$$D' \leftarrow \mathcal{F}^{-1}(\mathcal{F}(M)\mathcal{F}^*(S'))$$

wherein:
$\mathcal{F}$ is a Fast Fourier Transform (FFT);
$\mathcal{F}^{-1}$ is an inverse of the of the FFT;
M is the mask image;
S is the search image; and
S' is defined by $S'_{x,y} \leftarrow S_{x,y}^2$, for all x and y in S.

Evaluating the normalized cross-correlation equation can include determining a normalized cross-correlation N by:

$$N_{u,v} \leftarrow \frac{C_{u,v}}{\sqrt{D'_{u,v} - D_{u,v}^2/n}}$$

wherein $$C \leftarrow \mathcal{F}^{-1}(\mathcal{F}(P)\mathcal{F}^*(S)); \text{ and}$$

n is a number of ones in M.

The method can further include determining a maximum normalized cross-correlation of N, wherein the result depends on the maximum normalized cross-correlation. The method can further include restricting an offset in M based on a size of the portion identified by the mask image. The method can further include normalizing the pattern image so that the pattern image has a mean equal to zero and a variance equal to one. The result can include at least one selected from: a matrix indicating normalized cross-correlations for offsets of the mask image and the pattern image from a reference point in the search image; a binary variable indicating whether the search image matches the portion of the pattern image identified by the mask image; a portion of the search image matching the pattern; and at least two offset values indicating a normalized cross-correlation maximum between the search image and the portion of the pattern image identified by the mask image. Outputting the result can be performed as part of tracking an object in the search image. Outputting the result can be performed as part of applying a visual effect. Outputting the result can be performed as part of a face recognition procedure. Outputting the result can be performed as part of an animation procedure. Outputting the result can be performed as part of a medical imaging procedure. Outputting the result can be performed as part of an image stabilization procedure.

Outputting the result can be performed as part of a medical imaging procedure. Outputting the result can be performed as part of an image stabilization procedure.

In a second aspect, a computer program product is tangibly embodied in a computer-readable storage medium and includes instructions that when executed by a processor perform a method for pattern matching. The method includes receiving a pattern image, a mask image and a search image, the mask image having an arbitrary shape and identifying a portion of the pattern image. The method includes evaluating a normalized cross-correlation equation based on the pattern image, the mask image and the search image, including at least a convolution of the mask image and the search image. The method includes outputting a result of evaluating the normalized cross-correlation equation, the result indicating whether the search image matches the portion of the pattern image.

In a third aspect, a pattern-matching device includes an image component configured to receive a pattern image, a mask image and a search image, the mask image having an arbitrary shape and identifying a portion of the pattern image. The pattern-matching device includes a correlation component configured to evaluate a normalized cross-correlation equation based on the pattern image, the mask image and the search image, wherein the correlation component performs at least a convolution of the mask image and the search image. The pattern-matching device includes an output device outputting a result of evaluating the normalized cross-correlation equation, the result indicating whether the search image matches the portion of the pattern image.

Implementations can include any or all of the following features. The pattern-matching device can be implemented in a camera. The pattern-matching device can be implemented in medical imaging equipment. The pattern-matching device can be implemented in an animation system. The pattern-matching device can be implemented in a face recognition apparatus. The pattern-matching device can be implemented in a visual effects system.

Implementations can provide any or all of the following advantages. Pattern matching can be improved. A speed of performing pattern matching for an arbitrary shape can be increased. A number of calculations performed to determine a normalized cross-correlation can be reduced.

The details of one or more embodiments are set forth in the accompanying drawings and the description below. Other

DESCRIPTION OF DRAWINGS

Like reference symbols in the various drawings indicate like elements.

DETAILED DESCRIPTION

Figure 1:
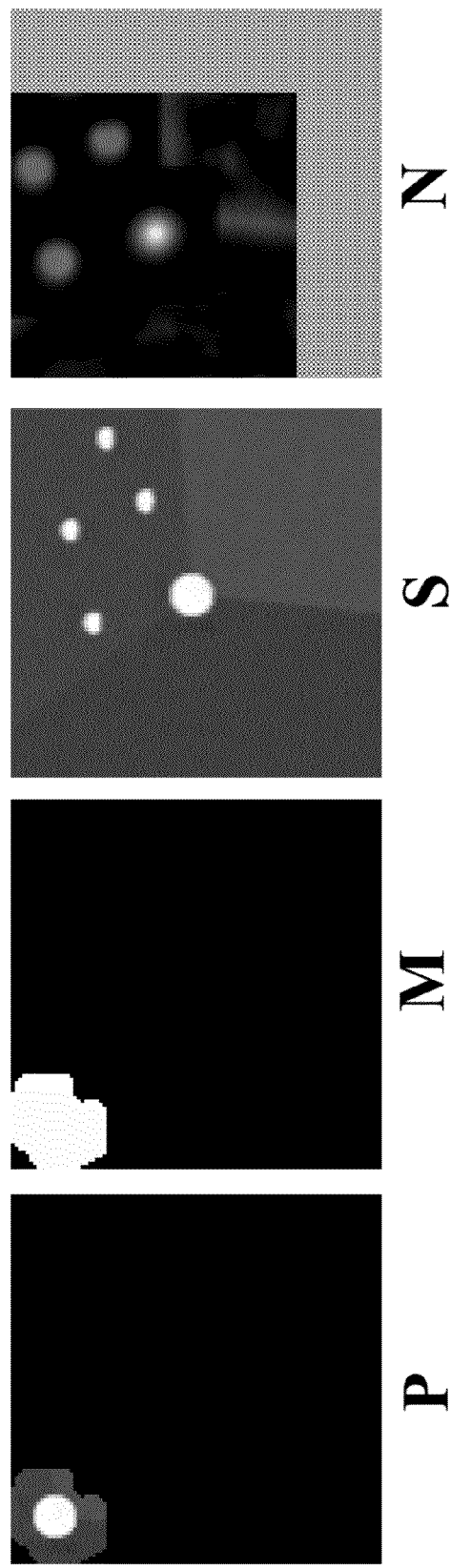
FIG. 1 shows examples of a pattern image, a mask image, a search image and a result image.

FIG. 1 shows examples of a pattern image P, a mask image M, a search image S and a result image N. In this example, the images can be represented by two-dimensional matrices where each value in the matrix corresponds to a portion of the image. For example, the pattern image P can include points of different intensities forming a pattern of an arbitrary shape. In examples below, it will be described that pattern matching can be effectively performed to determine whether the pattern occurs in the search image S. Pattern matching can involve evaluating a normalized cross-correlation equation based on the images, including at least a convolution of the mask image and the search image. In some implementations, a result of evaluating the normalized cross-correlation equation can be output. Such a result can indicate whether the search image matches the portion of the pattern image, for example when the pattern matching is performed to track an object in an image.

Here, the search image S has a size determined by parameters $s_x$ and $s_y$. The pattern image P is an $s_x \times s_y$ matrix of image intensities, such as representing an object or item of arbitrary shape. The mask image M is an $s_x \times s_y$ matrix of 0s and 1s, where 1 denotes that the corresponding pixel of the pattern image P belongs to the pattern. The search image S is an $s_x \times s_y$ matrix of image intensities, for example representing image content to be searched for occurrence(s) of the pattern. To match the pattern against the search image, the pattern and the mask can be swept across the search image and at each possible location a similarity metric can be calculated, such as a normalized cross-correlation. In examples below, such a sweep will be performed by iteratively offsetting the pattern and mask by predetermined amounts from a reference point.

In some implementations, the result image N can be output or otherwise used as an outcome of the pattern matching. For example, the result image can indicate the normalized cross-correlation between a portion of the pattern image P defined by the mask image M, and the search image S. Particularly, $N_{u,v}$ can denote the normalized cross-correlation obtained when the pattern and the mask have been offset u pixels to the right and v pixels down, from a reference point at the top left corner of the search image S. In some implementations, the result image N can be an $s_x \times s_y$ matrix.

The following is an exemplary description of a pattern matching involving the pattern image P, mask image M, search image S and result image N shown in FIG. 1. The pattern image includes a relatively substantial part of image intensities that are at or close to zero, as indicated by the large dark area in the pattern image. In a top left corner of the pattern image, however, nonzero intensities occur, forming a bright spot surrounded by a gray field. The mask image contents are mostly zeroes, indicating that most of the pixels in the pattern image are not considered part of the pattern that is of interest in this particular example. In the upper left corner, however, the mask image contains contents that are ones, because the corresponding pixels of the pattern image are considered part of the pattern of interest. The search image, in turn, contains an area of mostly dark but not completely black content, with a number of bright spots distributed therein. A lower right quadrant of the search image contains somewhat less dark content. The result image contains dark areas with brighter regions interspersed therein. One interpretation of the result image is: the brighter a particular one of its points is, the higher is the normalized cross-correlation between the pattern area defined by the mask and a region of the search image defined by offsetting the pattern and mask by the amount corresponding to the coordinates of the point in the result image.

In some implementations, however, it is only relevant to find the pattern if the entire pattern occurs within the search image S. That is, the fact that half of the pattern can be identified close to the edge of the search image may not be of interest in such implementations. Therefore, the offsets can be restricted. For example, the result image N is seen to have hashed edges 100. The edges 100 correspond to offset values that would place at least some of the pattern defined by the mask image outside the search image. Accordingly, such offset values can be ignored in some implementations.

The pattern image is normalized such that normalized cross-correlations between the pattern and the search image are obtained. For example, the pattern image can be normalized to have a mean equal to zero and a variance equal to one.

Normalized cross-correlation is one example of a similarity metric that can be used. The following is a standard equation for calculating normalized cross-correlation:

$$N_{u,v} = \frac{\sum_{M_{u,v}} [(S_{x,y} - \bar{S}_{u,v})(P_{x-u,y-v} - \bar{P})]}{\sqrt{\sum_{M_{u,v}} (S_{x,y} - \bar{S}_{u,v})^2 \sum_{M_{u,v}} (P_{x-u,y-v} - \bar{p}^2)}} \quad (1)$$

The terms and expressions in the equation are $N_{u,v}$ is the normalized cross-correlation at offset (u,v)

$M_{u,v}$ is the set of all image coordinates (x,y) such that $$\{(x,y), 1 \leq x \leq s_x, 1 \leq y \leq s_y, \Box M_{x-u,y-v} = 1\}$$

$$\bar{s}_{u,v} = \frac{\sum_{M_{u,v}} S_{x,y}}{n},$$

with $\bar{s}_{u,v}$ being the average of all pixels in S whose coordinates are in $M_{u,v}$ and n being a number of ones in M $$\bar{p} = \frac{\sum_{M_{0,0}} P_{x,y}}{n},$$

with $\bar{p}$ being the average of all pixels in P where M is 1

If the pattern image is prenormalized to have a mean of zero and a variance of one, then equation (1) can be simplified to $$N_{u,v} = \frac{\sum_{M_{u,v}} (S_{x,y} P_{x-u,y-v})}{\sqrt{\sum_{M_{u,v}} S_{x,y}^2 - \frac{\left(\sum_{M_{u,v}} S_{x,y}\right)^2}{n}}} \quad (2)$$

Equation (2) can be used to find one or more normalized cross-correlation values for given pattern, mask and search images. The following is an example of such a process.

A convolution can be performed. In some implementations, the pattern image, mask image and search image can be convolved using the Fast Fourier Transform (FFT), the inverse FFT and the complex conjugate of the FFT. For example, the following calculations can be performed:

$C \leftarrow \mathcal{F}^{-1}(\mathcal{F}(P) \mathcal{F}^*(S))$;

$D \leftarrow \mathcal{F}^{-1}(\mathcal{F}(M) \mathcal{F}^*(S))$; and $D' \leftarrow \mathcal{F}^{-1}(\mathcal{F}(M) \mathcal{F}^*(S'))$ wherein:
$\mathcal{F}$ is a Fast Fourier Transform (FFT);
$\mathcal{F}^{-1}$ is an inverse of the of the FFT;
M is the mask image;
S is the search image; and
S' is defined by $S'_{x,y} \leftarrow S_{x,y}^2$ for all x and y in S It can be seen that the matrix C relates to the numerator of equation (2) and the matrices D and D' relate to the denominator of equation (2). Particularly, the convolution relating to the denominator of equation (2) allows a pattern or an arbitrary shape to be used, because the mask defines the relevant pixels of the pattern image, and allows equation (2) to be evaluated relatively quickly. Particularly, matrices are transformed to a complex frequency space where the convolutions correspond to element-by-element multiplications of the transformed matrices.

For example, using the above convolutions, equation (2) can be evaluated by looping over all values of v from 0 to $(p_y-1)$ and over all values of u from 0 to $(p_x-1)$, and calculating N as follows:

$$N_{u,v} \leftarrow \frac{C_{u,v}}{\sqrt{D'_{u,v} - D_{u,v}^2/n}} \quad (3)$$

It is noted that expression (3) can be calculated quickly using the element-by-element multiplications mentioned above. For example, element-by-element matrix multiplications can take on the order of $n^2$ time, so the total time required may be dominated by the time needed to calculate the FFT, which is order $n^2 \log n$.

In some implementations, a maximum normalized cross-correlation can be determined. For example, the result image N in FIG. 1 is seen to have multiple bright spots, corresponding to relatively high normalized cross-correlation values. By identifying the maximum value, an output can be generated that indicates the best matching portion of the search image S. For example, an automated process can loop over the values of N and find the highest one.

Figure 2:
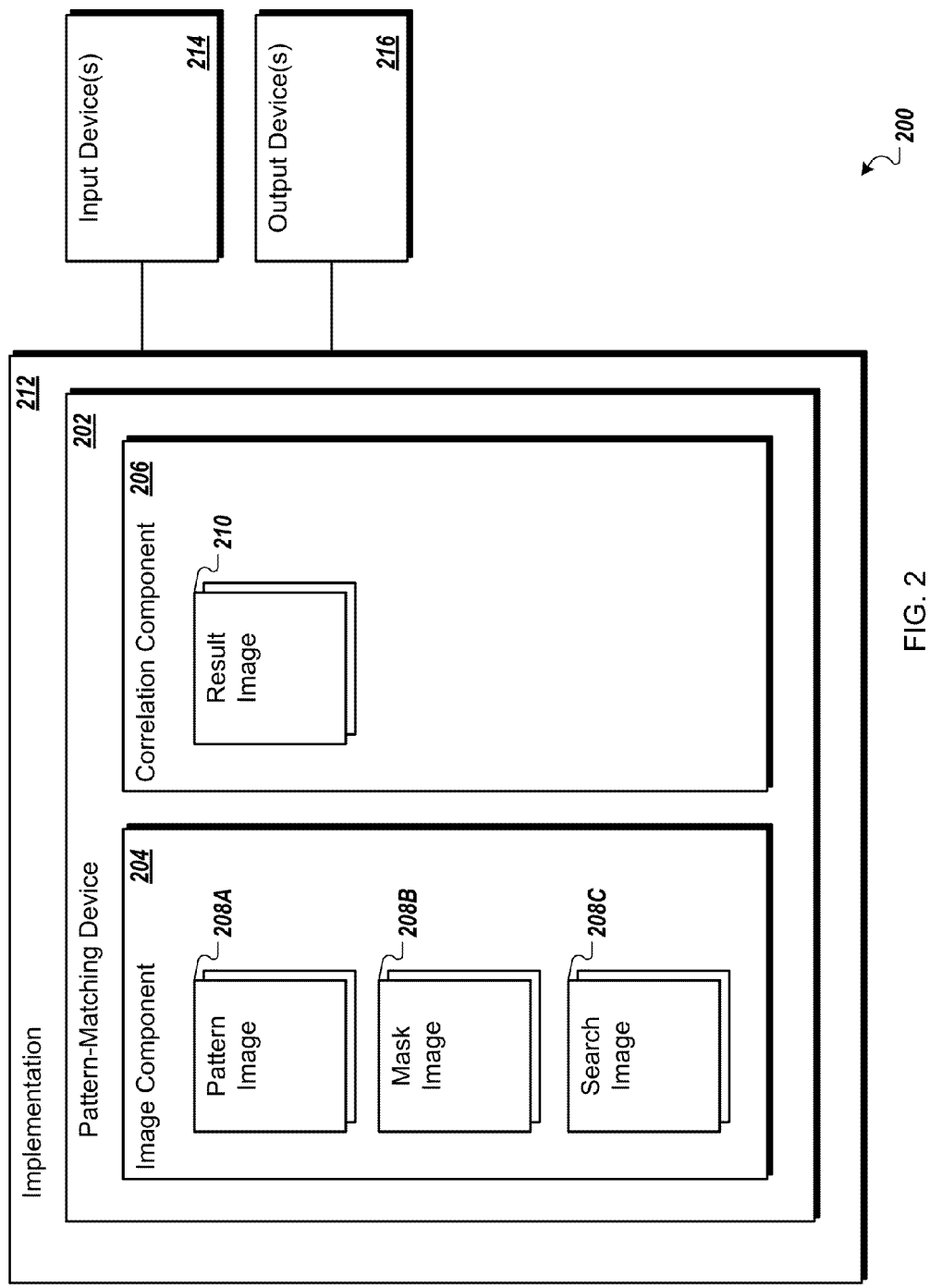
FIG. 2 shows an example of a system including a pattern-matching device.

FIG. 2 shows an example of a system 200 including a pattern-matching device 202. The pattern-matching device 202 includes an image component 204 and a correlation component 206. For example, the image component 204 can receive or otherwise include one or more pattern images 208A, one or more mask images 208B and one or more search images 208C. The images P, M and S described above are examples of the images 208A-C, respectively.

The correlation component 208 can determine a normalized cross-correlation between the pattern image(s) 208A and the search image 208C. In some implementations, one or more result images 210 can be generated. The result image N described above is an example of the result image 210.

The pattern-matching device 202 can be implemented in any or all of multiple ways. Here, the pattern-matching device 202 is schematically shown as included in an implementation 212 to which can be connected likewise schematically illustrated input device(s) 214 and output device(s) 216.

The following are examples of implementations for purpose of exemplification.

The implementation 212 can be a camera. For example, the pattern-matching device 202 can be implemented to perform image stabilization in an image captured by the camera. The input device 214 can include a lens and photosensitive surface of the camera, and the output device 216 can include a removable memory device or a photographic film, to name a few examples.

The implementation 212 can include medical imaging equipment. For example, the pattern-matching device 202 can be implemented to perform medical imaging in an image captured by the medical imaging equipment. The input device 214 can include an x-ray machine and/or MRI imaging device, and the output device 216 can include a display device or other component for a doctor to evaluate the pattern matching.

The implementation 212 can include an animation system. For example, the pattern-matching device 202 can be implemented to perform animation in an image to be output by the animation system, such as in an animated motion picture or instructional video. The input device 214 can include a program that generates an image, such as a graphics design application, and the output device 216 can include a storage device for the movie or video, to name a few examples.

The implementation 212 can include a face-recognition apparatus. For example, the pattern-matching device 202 can be implemented to perform facial-recognition processing of a surveillance image. The input device 214 can include a surveillance camera, and the output device 216 can include a display device or other component showing a result of the face recognition, to name a few examples.

The implementation 212 can include a visual-effects system. For example, the pattern-matching device 202 can be implemented to create visual effects for an image. The input device 214 can include a program that generates an image, such as a graphics design application, and the output device 216 can include a storage device for the image and the generated visual effect. In some implementations, the output is a marker (i.e., an indicator) that shows the point in the search image that has the best match.

Figure 3:
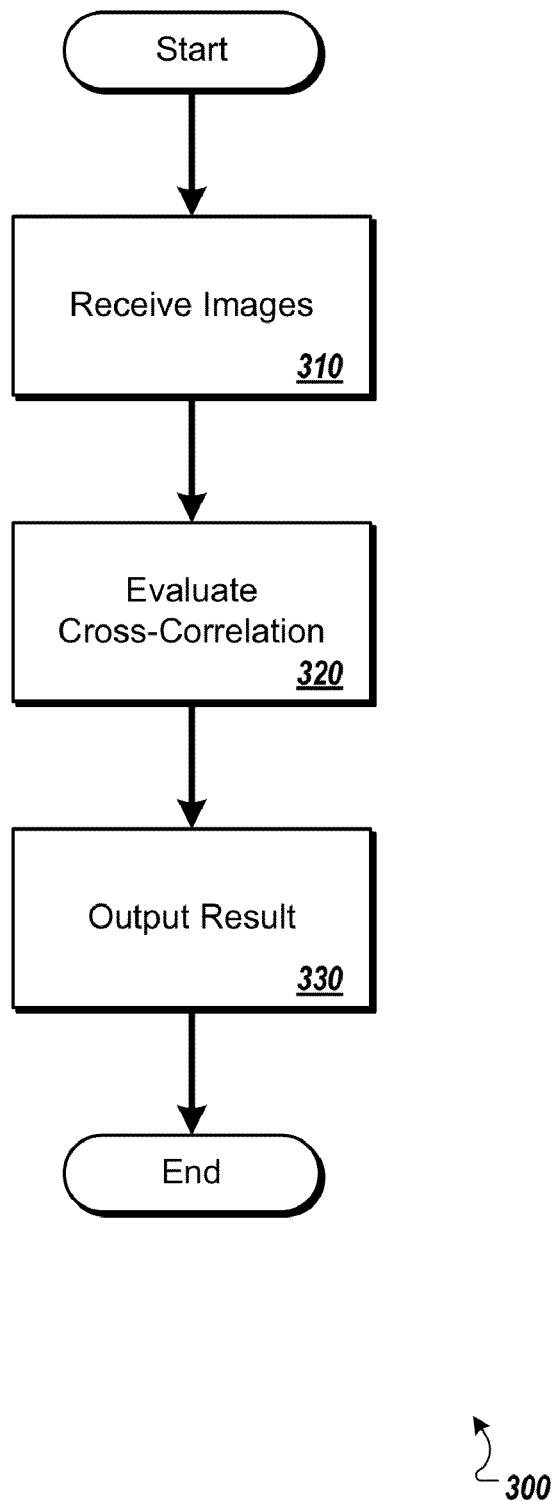
FIG. 3 shows a flowchart of an example method for pattern matching.

FIG. 3 shows a flowchart of an example method 300 for pattern matching. The method 300 can be performed by a processor executing instructions stored in a computer-readable medium, such as in the system 200. One or more steps can be performed in a different order; as another example, more or fewer steps can be performed.

In step 310, a pattern image, a mask image and a search image are received. The mask image has an arbitrary shape and identifies a portion of the pattern image. For example, the image component 204 can receive any of the images P, M and S.

In step 320, normalized cross-correlation is evaluated based on the pattern image, the mask image and the search image, including at least a convolution of the mask image and the search image. For example, the correlation component 206 can evaluate normalized cross-correlation using equation (2).

In step 330, a result of evaluating the normalized cross-correlation equation is output. The result indicates whether the search image matches the portion of the pattern image. For example, the output device 216 can output the result image N, a binary decision (e.g., does S match the portion of P defined by M?) or at least a portion of a search image matching the pattern (e.g., the search image S can be zoomed to the portion matching P). One or more other results can be output.

Figure 4:
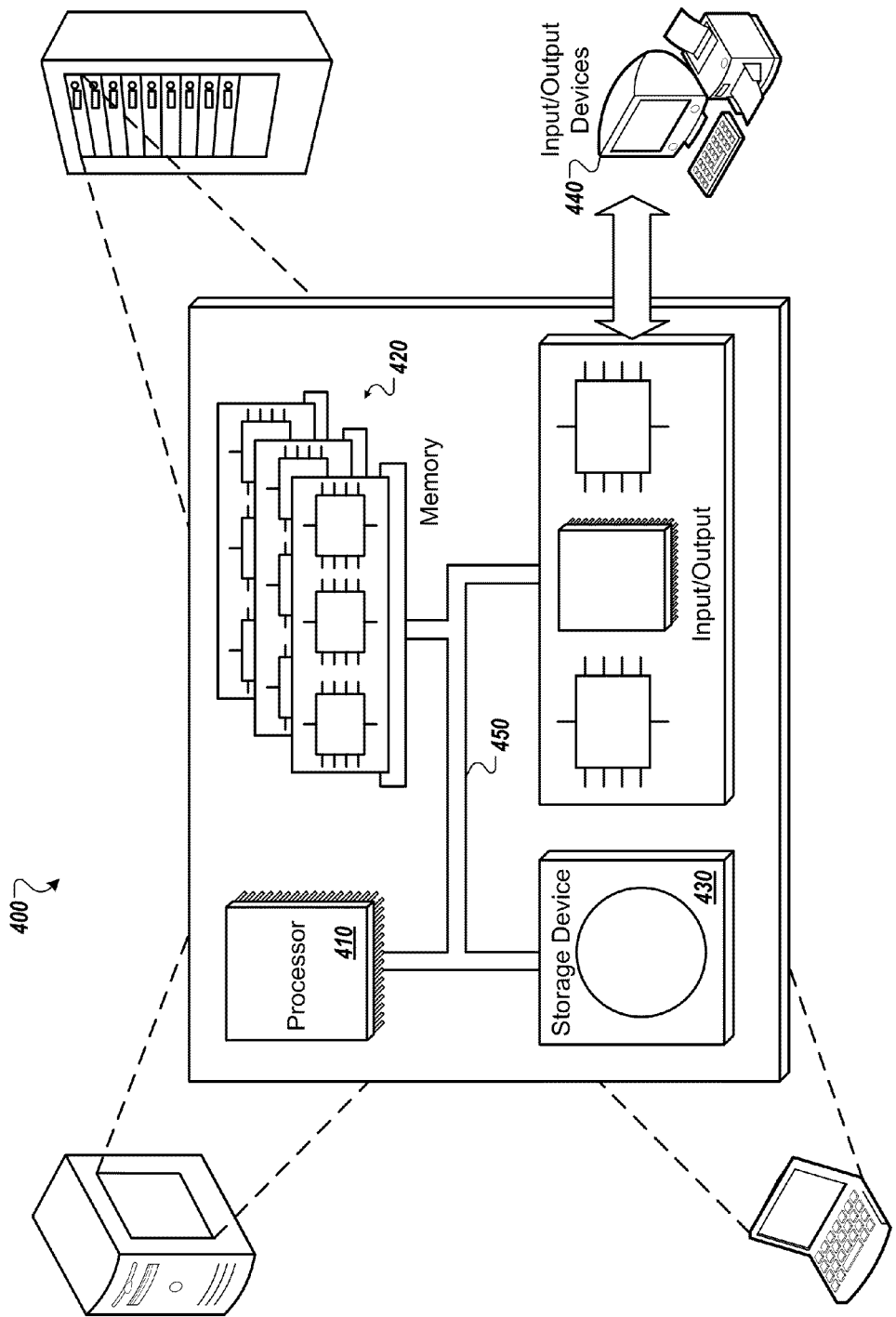
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for pattern matching, the method comprising:
receiving a pattern image, a mask image and a search image, the mask image having an arbitrary shape and identifying a portion of the pattern image;
evaluating a normalized cross-correlation equation based on the pattern image, the mask image and the search image, including at least a convolution of (i) the pattern image, masked by the mask image, and (ii) the search image, wherein the evaluation comprises a normalization to a mean equal to zero and a variance equal to one; and
outputting a result of evaluating the normalized cross-correlation equation, the result indicating whether the search image matches the portion of the pattern image.

2. The computer-implemented method of claim 1, wherein the convolution includes at least $$D \leftarrow \mathcal{F}^{-1}(\mathcal{F}(M)\mathcal{F}^*(S)); \text{ and}$$

$$D' \leftarrow \mathcal{F}^{-1}(\mathcal{F}(M)\mathcal{F}^*(S'))$$

wherein:
D and D' are matrices used in the convolution;
$\mathcal{F}$ is a Fast Fourier Transform (FFT);
$\mathcal{F}^{-1}$ is an inverse of the FFT;
$\mathcal{F}^*$ is a complex conjugate of the FFT;
M is the mask image;
S is the search image; and
S' is defined by $S'_{x,y} \leftarrow S_{x,y}^2$ for all x and y in S.

3. The computer-implemented method of claim 2, wherein evaluating the normalized cross-correlation equation comprises determining a normalized cross-correlation N by:

$$N_{u,v} \leftarrow \frac{C_{u,v}}{\sqrt{D'_{u,v} - D_{u,v}^2/n}}$$

wherein $$C \leftarrow \mathcal{F}^{-1}(\mathcal{F}(P)\mathcal{F}^*(S)); \text{ and}$$

n is a number of ones in M.

4. The computer-implemented method of claim 3, further comprising:
determining a maximum normalized cross-correlation of N, wherein the result depends on the maximum normalized cross-correlation.

5. The computer-implemented method of claim 3, further comprising:
restricting an offset in M based on a size of the portion identified by the mask image.

6. The computer-implemented method of claim 1, wherein the normalization comprises prenormalizing the pattern image so that the pattern image has a mean equal to zero and a variance equal to one.

7. The computer-implemented method of claim 1, wherein the result includes at least one selected from:
a matrix indicating normalized cross-correlations for offsets of the mask image and the pattern image from a reference point in the search image;
a binary variable indicating whether the search image matches the portion of the pattern image identified by the mask image;
a portion of the search image matching the pattern; and
at least two offset values indicating a normalized cross-correlation maximum between the search image and the portion of the pattern image identified by the mask image.

8. The computer-implemented method of claim 1, wherein outputting the result is performed as part of tracking an object in the search image.

9. The computer-implemented method of claim 1, wherein outputting the result is performed as part of applying a visual effect.

10. The computer-implemented method of claim 1, wherein outputting the result is performed as part of a face recognition procedure.

11. The computer-implemented method of claim 1, wherein outputting the result is performed as part of an animation procedure.

12. The computer-implemented method of claim 1, wherein outputting the result is performed as part of a medical imaging procedure.

13. The computer-implemented method of claim 1, wherein outputting the result is performed as part of an image stabilization procedure.

14. A computer program product embodied in a non-transitory computer-readable storage medium and comprising instructions that when executed by a processor perform a method for pattern matching, the method comprising:
receiving a pattern image, a mask image and a search image, the mask image having an arbitrary shape and identifying a portion of the pattern image;
evaluating a normalized cross-correlation equation based on the pattern image, the mask image and the search image, including at least a convolution of (i) the pattern image, masked by the mask image, and (ii) the search image, wherein the evaluation comprises a normalization to a mean equal to zero and a variance equal to one; and
outputting a result of evaluating the normalized cross-correlation equation, the result indicating whether the search image matches the portion of the pattern image.

15. A pattern-matching device comprising:
an image component configured to receive a pattern image, a mask image and a search image, the mask image having an arbitrary shape and identifying a portion of the pattern image;
a correlation component configured to evaluate a normalized cross-correlation equation based on the pattern image, the mask image and the search image, wherein the correlation component performs at least a convolution of (i) the pattern image, masked by the mask image, and (ii) the search image, wherein the evaluation comprises a normalization to a mean equal to zero and a variance equal to one; and
an output device outputting a result of evaluating the normalized cross-correlation equation, the result indicating whether the search image matches the portion of the pattern image.

16. The pattern-matching device of claim 15, implemented in a camera.

17. The pattern-matching device of claim 15, implemented in medical imaging equipment.

18. The pattern-matching device of claim 15, implemented in an animation system.

19. The pattern-matching device of claim 15, implemented in a face recognition apparatus.

20. The pattern-matching device of claim 15, implemented in a visual effects system.

* * * * *